US 9,853,426 B2

United States Patent
Hendricks

(10) Patent No.: US 9,853,426 B2
(45) Date of Patent: Dec. 26, 2017

(54) OBJECT MANIPULATION DEVICE, SYSTEM, AND METHOD

(71) Applicant: Shining Sea Trading Company, West Valley City, UT (US)

(72) Inventor: Jared Hendricks, Draper, UT (US)

(73) Assignee: Shining Sea Trading Company, West Valley City, UT (US)

( * ) Notice: Subject to any disclaimer, the term of this patent is extended or adjusted under 35 U.S.C. 154(b) by 0 days.

(21) Appl. No.: 14/852,491

(22) Filed: Sep. 11, 2015

(65) Prior Publication Data

US 2016/0190781 A1 Jun. 30, 2016

Related U.S. Application Data

(60) Provisional application No. 62/049,309, filed on Sep. 11, 2014.

(51) Int. Cl.
| | | |
|---|---|---|
| *B25B 9/00* | (2006.01) | |
| *H02G 1/04* | (2006.01) | |
| *B25G 1/04* | (2006.01) | |

(52) U.S. Cl.
CPC .............. *H02G 1/04* (2013.01); *B25G 1/04* (2013.01)

(58) Field of Classification Search
CPC ...... H02G 1/04; B25G 1/04; B25J 1/02; B25J 1/04; B25J 1/00; A47F 13/06; A45B 3/00
USPC ..... 294/132, 209, 210, 174, 22, 23, 24, 50.9
See application file for complete search history.

(56) References Cited

U.S. PATENT DOCUMENTS

| | | | | |
|---|---|---|---|---|
| 316,524 A | * | 4/1885 | Colby et al. ............... | B25J 1/04 294/111 |
| 366,369 A | * | 7/1887 | Bierman .................... | B25J 1/04 294/23 |
| 388,776 A | * | 8/1888 | Hall .......................... | B25J 1/04 294/22 |
| 840,996 A | * | 1/1907 | Dennis ....................... | B25J 1/04 294/23 |
| 854,578 A | * | 5/1907 | Heath ........................ | H02G 1/02 24/115 R |
| 2,905,498 A | * | 9/1959 | Lunde ........................ | B25J 1/04 294/104 |
| 3,091,491 A | * | 5/1963 | Adler ......................... | B25J 1/04 294/106 |
| 4,483,562 A | | 11/1984 | Schoolman | |
| 4,834,760 A | * | 5/1989 | Richter, Jr. ............. | A61F 2/588 294/104 |
| 4,965,930 A | * | 10/1990 | Wnukowski ............. | H02G 1/02 254/134.3 R |
| 5,730,033 A | | 3/1998 | Mitrowski | |
| 5,964,489 A | * | 10/1999 | Mahoney .................. | B25J 1/04 248/339 |

(Continued)

OTHER PUBLICATIONS

Irby Catalog; "Hot Sticks, Tools and Grips"; irby Tool & Safety; (2009); p. 71-88; www.irby.com.

(Continued)

*Primary Examiner* — Gabriela Puig
(74) *Attorney, Agent, or Firm* — Thorpe North & Western, LLP

(57) ABSTRACT

A tool includes a grasping mechanism, an extendable pole operably connected to the grasping mechanism at a free end thereof, and a handle mechanism for manipulating the grasping mechanism. The handle mechanism is operably connected to the extendable pole.

18 Claims, 10 Drawing Sheets

(56) References Cited

U.S. PATENT DOCUMENTS

| | | | |
|---|---|---|---|
| 6,079,141 A | 6/2000 | Washecka | |
| 6,223,628 B1 | 5/2001 | Barron | |
| 6,227,584 B1 * | 5/2001 | Reuther | F21S 4/10 294/104 |
| 6,352,291 B1 * | 3/2002 | Tortajada | F21S 4/10 294/211 |
| 6,473,953 B1 * | 11/2002 | Portnoff | B25B 5/06 269/3 |
| 6,546,596 B2 | 4/2003 | Grote et al. | |
| 7,066,511 B2 | 6/2006 | Newman et al. | |
| 8,186,012 B2 | 5/2012 | Mann | |
| 8,459,712 B2 * | 6/2013 | Thrasher | B25B 31/00 248/219.2 |
| 8,469,425 B1 | 6/2013 | Lofley, Sr. et al. | |
| 8,752,877 B2 * | 6/2014 | Spindler | F21S 4/10 294/209 |
| 8,783,746 B1 * | 7/2014 | Mello | B25J 1/04 294/104 |
| 9,056,393 B1 * | 6/2015 | Gary | B25J 1/02 |
| 2004/0189028 A1 * | 9/2004 | Newman | F16B 7/149 294/210 |
| 2006/0230581 A1 | 10/2006 | Richardson et al. | |
| 2010/0201142 A1 * | 8/2010 | Tu | B25J 1/04 294/210 |
| 2012/0284997 A1 * | 11/2012 | Morin | H01R 11/14 29/525.01 |
| 2013/0333197 A1 * | 12/2013 | Schulte | B25J 1/04 29/525.08 |
| 2014/0259534 A1 * | 9/2014 | Shields | B25G 1/04 16/429 |

OTHER PUBLICATIONS

Wooster Brush Catalog; "Extension Poles", Paint Equipment; (Nov. 12, 2013); 2 pages; The Wooster Brush Company; http://www.woosterbrush.com/Catalog/PaintingEquipment/ExtensionPoles.

Soldial-Amazon.Com; "Sodial-Long Arm 23 Extension Grabber Easy Reach Reacher Pick Litter"; (Nov. 12, 2013); 6 pages; Hong Kong; http://www.amazon.com/SODIAL-Extension-Grabber-Reacher- . . . .

Geodata Systems Management Inc.; "TeleScoping Poles"; (Nov. 12, 2013); 2 pages; Berea, Ohio, USA; http://www.geodatasys.com/pole.htm.

* cited by examiner

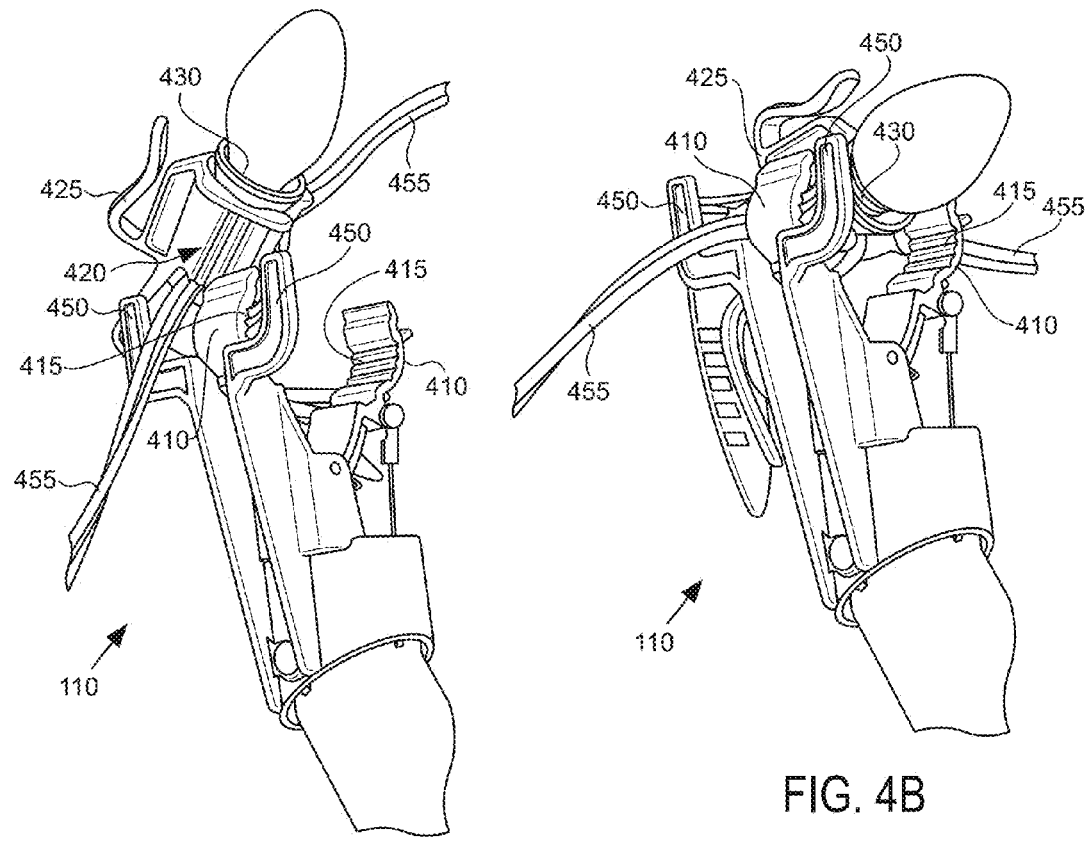
FIG. 4A
FIG. 4B
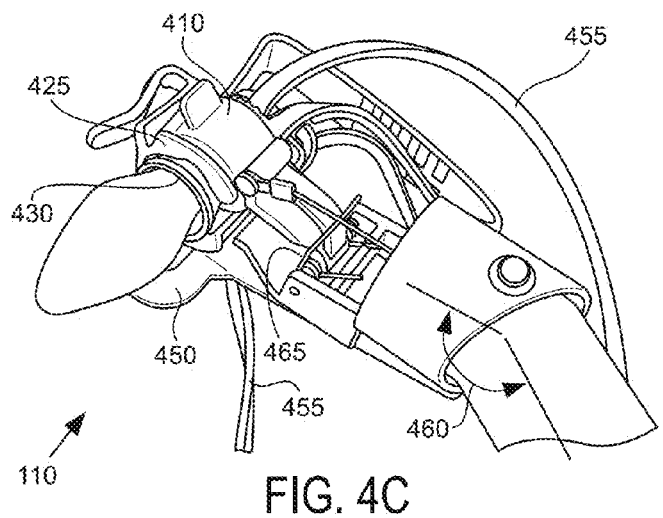
FIG. 4C

OBJECT MANIPULATION DEVICE, SYSTEM, AND METHOD

PRIORITY DATA

The present application claims the benefit of U.S. Provisional Patent Application No. 62/049,309, filed on Sep. 11, 2014, the entirety of which is incorporated herein by reference.

BACKGROUND

Installation and removal of decorations, including, for example, Christmas light strings on houses and trees, may be difficult without special tools. Ladders and scaffolding, for example, may be required in order to reach high or distant locations for placement of decorations.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 4A depicts a perspective view of an example of a grasping mechanism according to the present disclosure with a wire guide showing orientation of a clip on a wire;

FIG. 4B depicts a perspective view of the example of FIG. 4A with further manipulation;

FIG. 4C depicts a perspective view of the example of FIG. 4A with still further manipulation;

Figure 1:
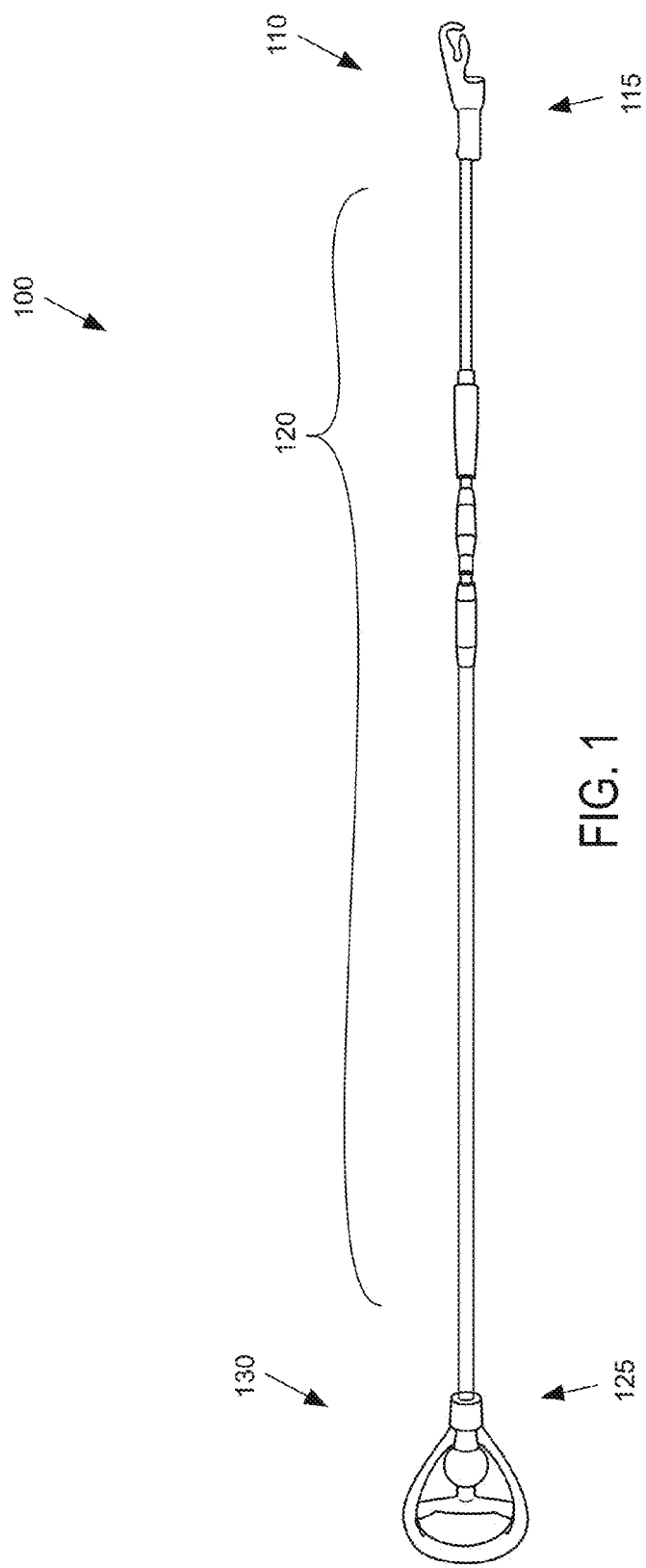
FIG. 1 depicts an example of a tool according to the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the relative placement of one object with respect to another object. In some examples, objects that are described as being "adjacent" to one another may be in a side-by-side or other similar positional relationship that can include objects that are in direct contact with one another and objects that are in close proximity to one another. The exact degree of proximity may in some cases depend on the specific context.

As used herein, "coupled" refers to a relationship of connection or attachment between one item and another item, and includes relationships of either direct or indirect connection or attachment. Any number of items can be coupled, such as materials, components, structures, layers, devices, objects, etc.

As used herein, "directly coupled" refers to a relationship of physical connection or attachment between one item and another item, where the items have at least one point of direct physical contact.

As used herein, "indirectly coupled" refers to a relationship of connection or attachment between one item and another item where the items do not have a point of direct physical contact with one another. Rather, such items can be connected, attached, or joined together by an intermediate item. For example, when a first layer of material is bound or joined to a second layer of material using an intermediate layer in between the first and second layer, the first and second layers can be said to be indirectly coupled.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Disclosed is a system for multiple uses including manipulation of a variety of items, including utility items, such as safety lighting, informational markings, and the like, as well as decorative items, such as holiday and non-holiday decorations. Exemplary decorations can include any type of decoration that can be displayed, either outdoors or indoors. For convenience, the following description will refer primarily to decorations, but it should be understood that any item or items that can be manipulated using the present technology is included in the present scope. As one example, decorations may include holiday decorations such as Halloween or Christmas decorations. Such decorations can include lights, greenery, and the like, as well as any other hangable decorative item type that can be hung on buildings, trees, interior walls, vaulted ceilings, or other high or difficult to reach places. Other examples can include smoke alarms, light bulbs, etc. In one specific example, the present technology can allow for easier installation and removal of holiday lights from places that otherwise can be difficult to reach without a ladder.

Now referring to FIG. 1, one exemplary system includes a tool 100 that can have a grasping mechanism 110, an extendable pole 120, and a handle mechanism 130. The grasping mechanism 110 can function to manipulate an object from a distance by control via the extendable pole 120 and handle mechanism 130. The handle mechanism 130 can be located at a base end 115 of the tool 100 for manipulation with the extendable pole 120 by a user. The grasping mechanism 160 can be located at an opposite end 125 of the pole 120 for manipulation of an object.

In one example, the extendable pole 120 of the tool 100 can have multiple extension portions that operably connect to one another. In another example, the extendable pole 120 can a telescoping sections or mechanism. Such a telescoping section can include any type of telescoping mechanism capable of extension and manipulation of the grasping mechanism. In one example, the telescoping section can include two poles that are configured to slidably extend and retract out of and into one another for extending and retracting the extendable pole 120. Maximum and minimum length configurations can allow the telescoping sections to vary in position from mostly concealed to mostly exposed positions. It is noted, however, that the grasping mechanism is functional at both the maximum and minimum extension lengths of the extendable pole, in some cases without manual length adjustments of the grasping mechanism itself by a user.

Various grasping mechanism implementations can be utilized, and any mechanism that allows remote activation of the grasping mechanism is considered to be within the present scope. In some cases, a connective member can run through the center of each extension portion, or through the center of each telescoping section. The connective member or connective mechanism can include any type of device or item that can transmit some physical force from the handle mechanism to the grasping mechanism of the tool. Non-limiting examples can include wires, tapes, ribbons, cables, tubes, and the like, including appropriate combinations thereof. Thus, as the pole is extended and retracted, whether it be through telescoping or adding or removing additional portions, the connection between the handle and the grasping mechanism is maintained by the connective member. In some examples, extension portions with the associated connective members can screw together or otherwise operably interact to extend the pole. For example, the extension portion may include snap fittings for quick release at any of the exterior interfacing components and interior interfacing components. The wire may have quick release features at one or more connective ends thereof, and the exterior tubing may also have quick release features at one or more connective ends thereof.

Figure 2:
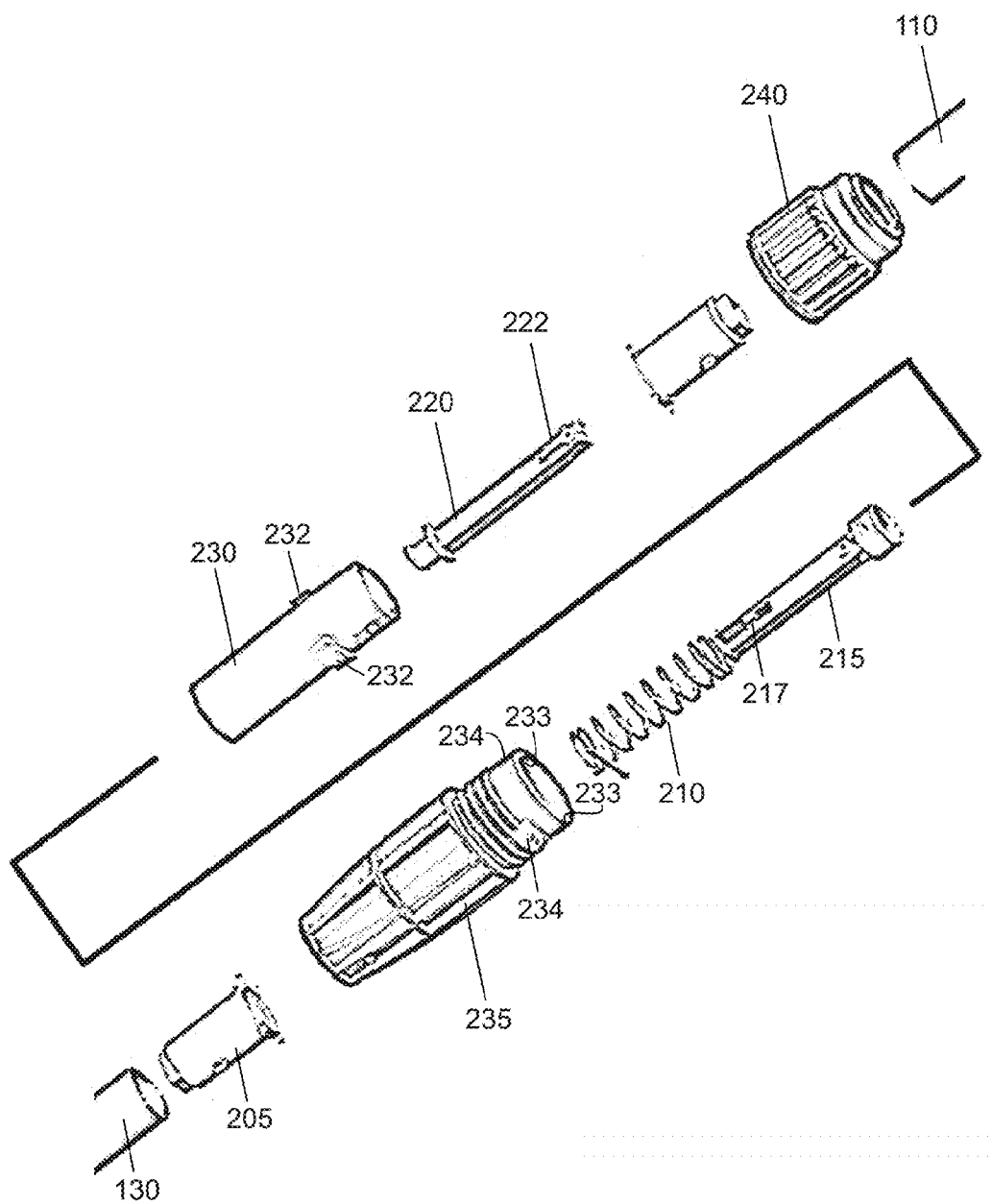
FIG. 2 depicts an exploded perspective view of an example of a telescoping pole mechanism according to the present disclosure.
Figure 3:
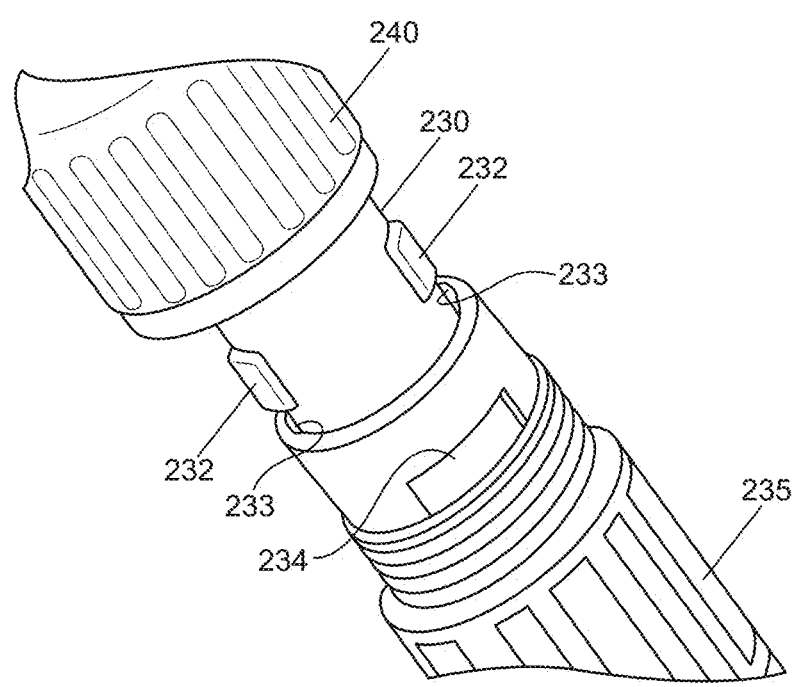
FIG. 3 depicts a perspective view of an example of a telescoping pole mechanism according to the present disclosure.
Figure 4D:
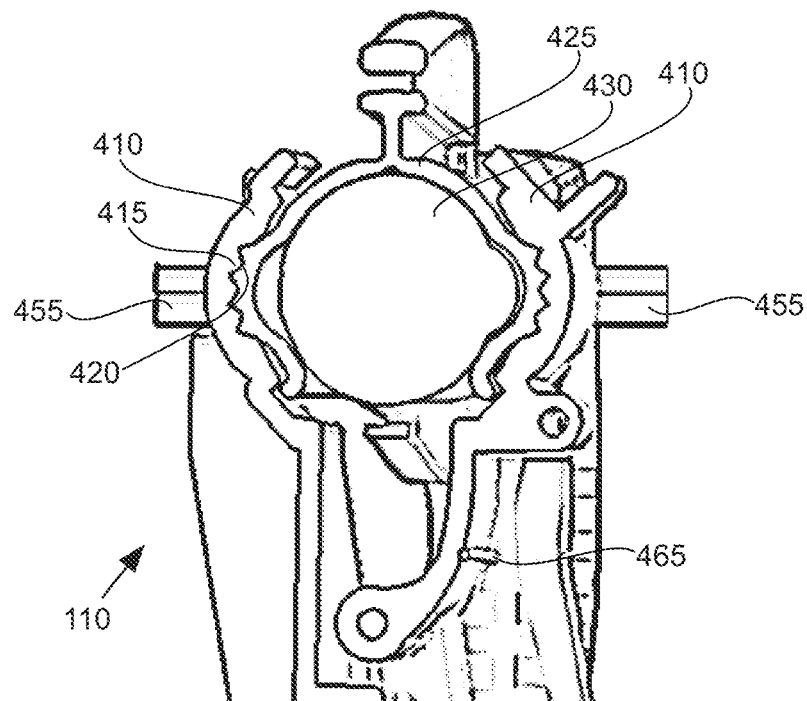
FIG. 4D depicts a partial schematic cutaway view of an example of a grasping mechanism, a clip, and a light socket on a wire according to the present disclosure.
Figure 4E:
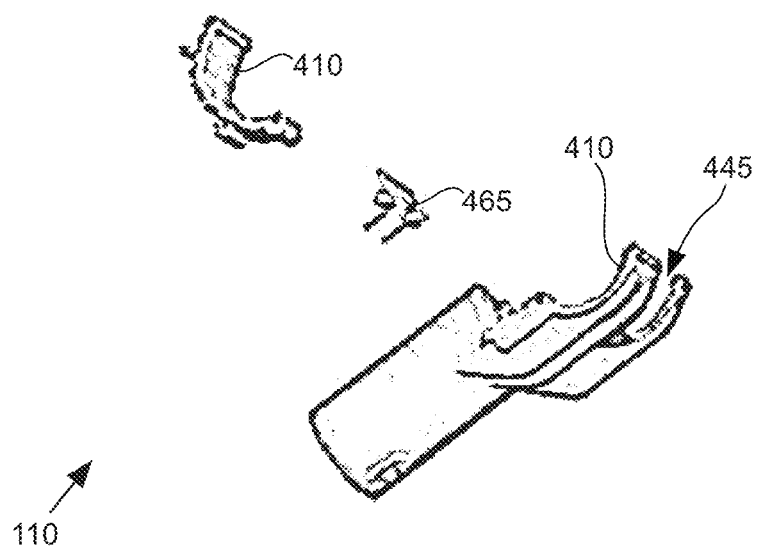
FIG. 4E depicts another example of a grasping mechanism according to the present disclosure.
Figure 4F:
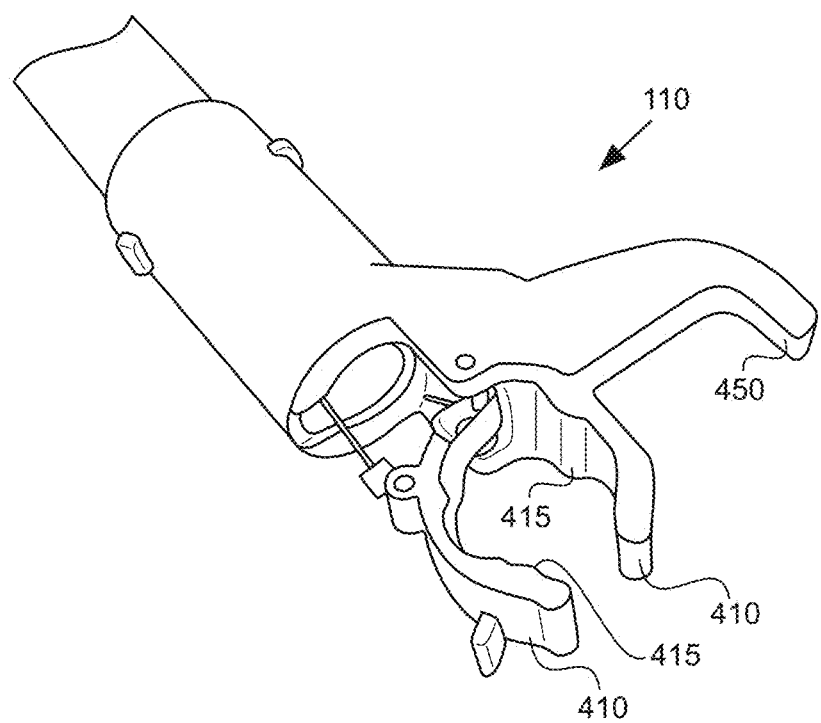
FIG. 4F depicts yet another example of a grasping mechanism according to the present disclosure.

Now referring to FIGS. 2 and 3, an example of a tool 100 is shown, where the interface between the extendable pole 120 and an object connecting to an end section thereof can include several pieces. For example, a grasping mechanism 110 may connect to an end section of the extendable pole 120 with several pieces. An alignment sleeve 205 rests inside the terminating end of the extendable pole 120 opposite the handle mechanism 130. The alignment sleeve 205 is fixed rotationally within the extendable pole 120 by riveting or other suitable fastening means. A coil spring 210 rests against the alignment sleeve 205 and reacts against an alignment pin 215 that is configured to interface with an opposing alignment pin 220 operatively connected to the grasping mechanism 110. A wire (not shown in these figures) is operably connected to the alignment pin 215 for operable connection with the handle mechanism 130 in wire connective features 217. The opposing alignment pin 220 on the grasping mechanism side sits within an opposing alignment sleeve 220 fixed rotationally relative to the grasping mechanism 110. A wire (not shown) can be operably connected to the opposing alignment sleeve 220 at wire connective features 222 for operable connection with the grasping mechanism 110. An installation orientation sleeve 230 sits fixed rotationally at the pole connecting end of the grasping apparatus 110 and is inserted into a corresponding opening of a twist lock sleeve 235 fixed for rotation about the end of the pole 120. The installation orientation sleeve 230 has radially extending protrusions 232 about an outer diameter thereof to be received within corresponding slots 233 formed into the inner diameter of a locking sleeve 235. The slots 233 open axially and upon a terminating distance for the connection with the installation orientation sleeve 230, the radially extending protrusions 232 can be rotated within the orientation sleeve 230 to be positioned about openings 234 adjacent the slots 233 in the sleeve 235 to align the pole 120 with the grasping mechanism 110. This rotation also locks the alignment pins 215, 220 together for axial displacement upon actuation of the handle mechanism 130. There can be features such as holes and protrusions on the alignment pins 215,220 allowing the pins 215,220 to nest within one another and upon rotation to remain in a position for retention of one another during pulling of the wire. Upon final alignment, the twist lock sleeve 240 can be slid into place and twisted to lock the two sections into place with a threaded connection. With these pieces in place and cooperating as a group, when the handle mechanism 130 is actuated, the alignment pin 215 actuates via the wire against the coil spring 210. The coil spring 210 is thereby compressed and the opposing alignment pin 220 of the grasping mechanism 110 is pulled from its resting position into an actuated position, allowing for the jaws of a claw or other grasping mechanism to open for operation.

Now referring to FIGS. 4A-4F, the grasping mechanism 110 can be configured to include opposing jaws 410. The opposing jaws 410 of the grasping mechanism 110 can have particular shaped features to provide effective manipulation of an object with corresponding features. For example, the grasping mechanism 110 may include opposing jaws 410 which have ridges 415 aligned with corresponding ridges 420 on a clip 425 to hold certain types of sockets 430 on strings of lights. Further, the grasping mechanism 110 opposing jaws 410 may have one or more cutout portions 445 that can be placed, for example, around a Christmas light wire, so that once one of the wire handling claw jaws 410 is on the light wire, a user can merely slide the grasping mechanism 110 along the wire 455 to the next light (or other object), eliminating the need for fumbling to try catching the light. The cutout portion 445 can be substituted or supplemented with one or more additional fingers 450 located on any one or more sides of the claw, extending from the claw gripping contact surfaces to provide manipulation features for the object, including wire 455 for a string of lights. The grasping mechanism 110 can be positioned at an angle relative to the axis of the pole 120 to suit the convenience of a user. For example, a section of frame or tubing may be oriented at an angle 460 relative to the pole but fixed at the opposing end thereof for creating an angular orientation of the grasping mechanism 110 attached to the section of frame or tubing.

The grasping mechanism 110 can have one of the opposing jaws 410 actuated and the other can be static. The actuation jaw can be pivotably connected to the static jaw. The opposing jaws 410 can be tension loaded and can be biased so that the opposing jaws 410 are normally closed. The biasing can be accomplished by a spring 465 positioned for reaction between the opposing jaws 410 or by other suitable means known to one skilled in the art.

The system can include a clip 425 to be used with the tool 100 to facilitate installation and removal of lights onto a variety of structures. The structures can include for example building features such as soffits, fascia, cutters, and shingles. The shape of the clip 425 can allow decorative lights including, for example, type C7 and C9, to be held together with associated light sockets 430 for which the lights are fixed into. For example, there can be grooves or voids to create space for certain types of lights. The clip 425 can also include features for holding mini lights, for example, a compliant extension to accept and retain the mini lights. The clip 425 can include additional features to removably affix the clip 425 with light into a building feature. For example, the clip 425 can include extensions to slide between sections of shingles or under the soffit and fascia, or to accept and retain portions of a roof gutter. The clip 425 can include ridges placed at selected portions of the clip 425 to facilitate retention of an object such as the clip 425 within the claw and at other portions to facilitate retention of the clip into the building feature.

Figure 5A:
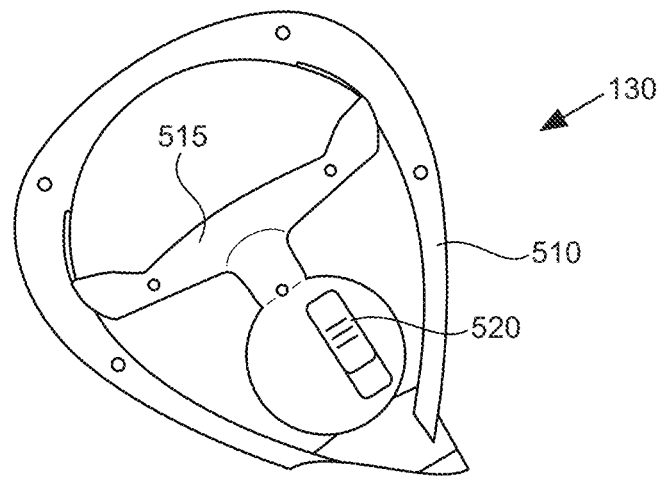
FIG. 5A depicts a partial perspective view of an example of a handle mechanism according to the present disclosure.
Figure 5B:
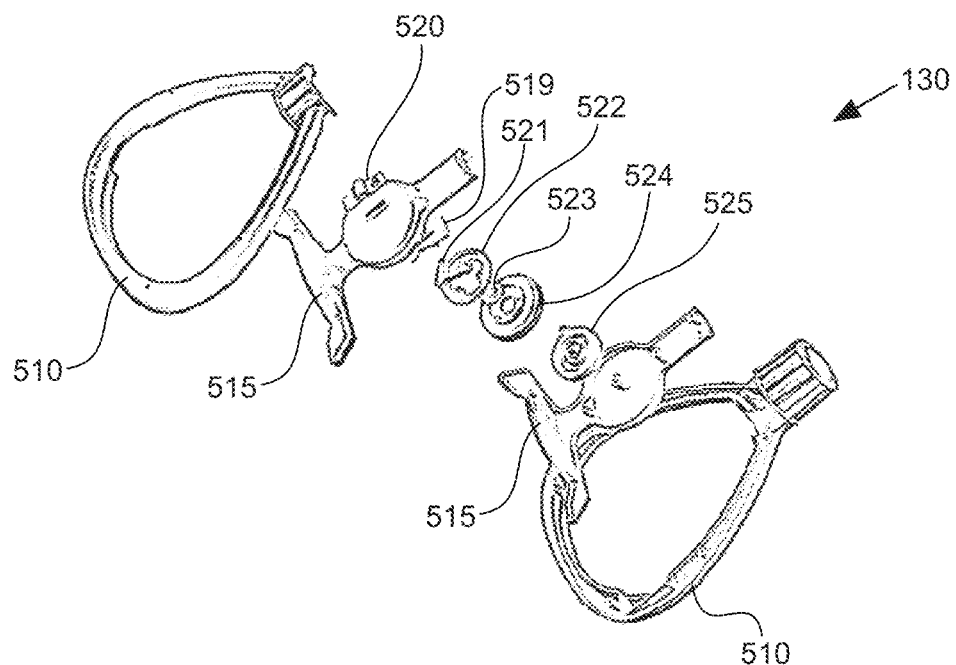
FIG. 5B depicts an exploded perspective view of an example of a telescoping pole according to the present disclosure.
Figure 5C:
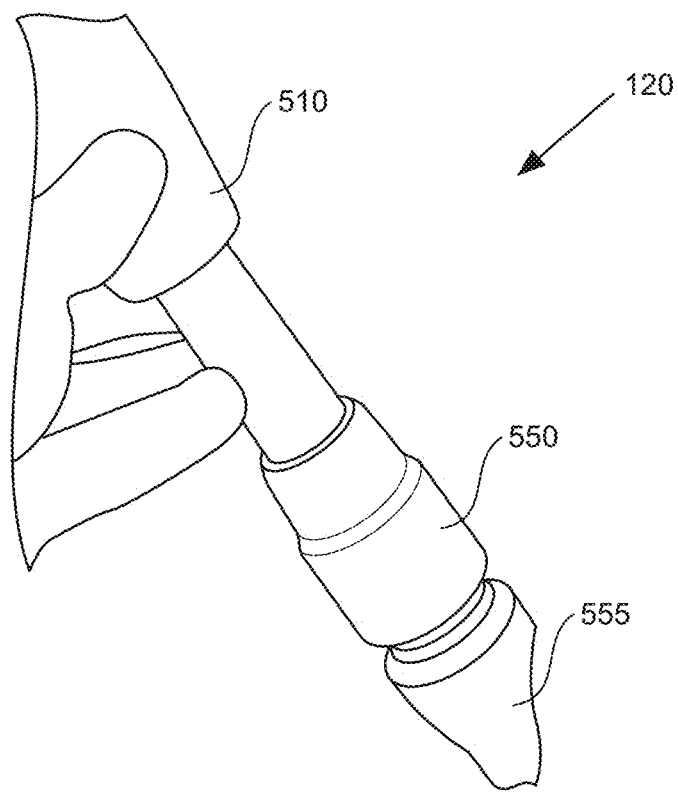
FIG. 5C depicts an a partial perspective view of an example of a telescoping pole according to the present disclosure.

Now referring to FIGS. 5A-5C, the handle mechanism 130 may be configured for actuation relative to a handle frame 510 component including a trigger 515 configured for ease of use for user actuation of the handle mechanism 130. For example, a user may grip the frame 510 and manipulate the trigger 515 with one hand while holding the pole extension 120 with another hand. The handle mechanism 130 can be operable to maintain cable control of the grasping mechanism 110 through the extendable pole 120. The handle mechanism 130 and the grasping mechanism 110 can be operatively connected through the extendable pole 120 by a wire or other connective material, such as tape, ribbon, rod, tube, or other material, so that the grasping mechanism 110 opens when the trigger 515 is pulled longitudinally away from the grasping mechanism 110 for a biased normally closed grasping mechanism 110. It is to be understood that various operating configurations can be used for the grasping mechanism 110, including a normally open grasping mechanism 110, whether biased or not. Other configurations compatible with the disclosure herein will be known to those of skill in the art.

The handle mechanism 130 includes an extension mode and a grasper/retraction mode, selectable by a switch 520 on the handle. The switch 520 can be a sliding component for the user to actuate. The switch can be operatively connected to an interfacing component 519 on the inside of the handle mechanism 130. In the extension mode, a user may disengage a twist lock collar 550 from a locking sleeve 555 on the extendable pole 120 to allow for extension thereof. As the pole 120 extends, the cable 525 (or connective mechanism) releases and extends from a coil actuated by the handle mechanism 130. It is to be understood that the cable 525 applies a pressure to the wire inside the pole 120 for a biasing toward the handle mechanism 130. In the grasper/retraction mode, the switch 520 engages the cable 525 to fix a length for activating the handle mechanism 130 control of the grasping mechanism 110. The switch 520 may also be configured to provide a ratcheting action to allow the cable 525 to retract within the handle mechanism 130. The coil of the cable 525 may be protected by an internal cover 524 for isolation of the coil from the adjacent components inside the handle mechanism 130. The handle mechanism 130 may include a hammer 521, a gear 522, and a spacer 523 for cooperation with the switch 520 and cable 525 in the handle mechanism 130.

In one example, the handle mechanism 130 can be actuated during a telescoping event where the extendable pole is manipulated to lengthen or shorten the overall length of the tool 100. This actuation can be done in a manner causing an unwinding of the cable 525 inside the handle mechanism 130. The cable 525 can have resistance to create a bias toward recoiling and thereby can apply a force to a connection piece that the cable 525 is attached to on the claw end of the cable 525. This biasing can create a retraction force applied to various internal components of the tool 100 in operative manipulation thereof. The cable 525 can also be non-biasing. For example, the cable 525 may be non-rigid or semi-rigid with insufficient spring force or resistance to an uncoiling action, so as to not provide significant recoil force. In some examples, the coiled cable 525 may be actuated by a pulling on a free end thereof by the connecting component. The connecting component in some cases may be the alignment pin 215. It is to be understood that a person of ordinary skill in the art having possession of this disclosure may be able to identify other arrangements of the coil and cable 525 configuration with respect to the handle mechanism 130 and with respect to the tool 100 generally.

Figure 6A:
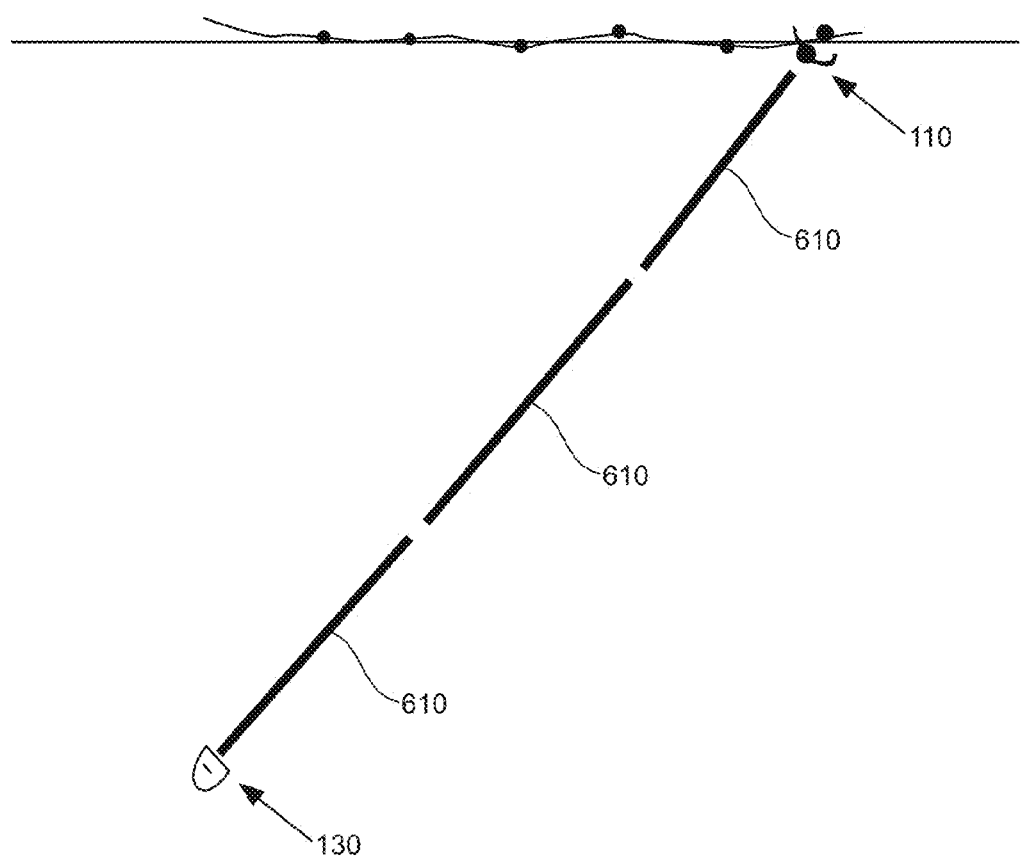
FIG. 6A depicts an exploded schematic view of an example of a tool having a multi-piece extendable pole according to the present disclosure.
Figure 6B:
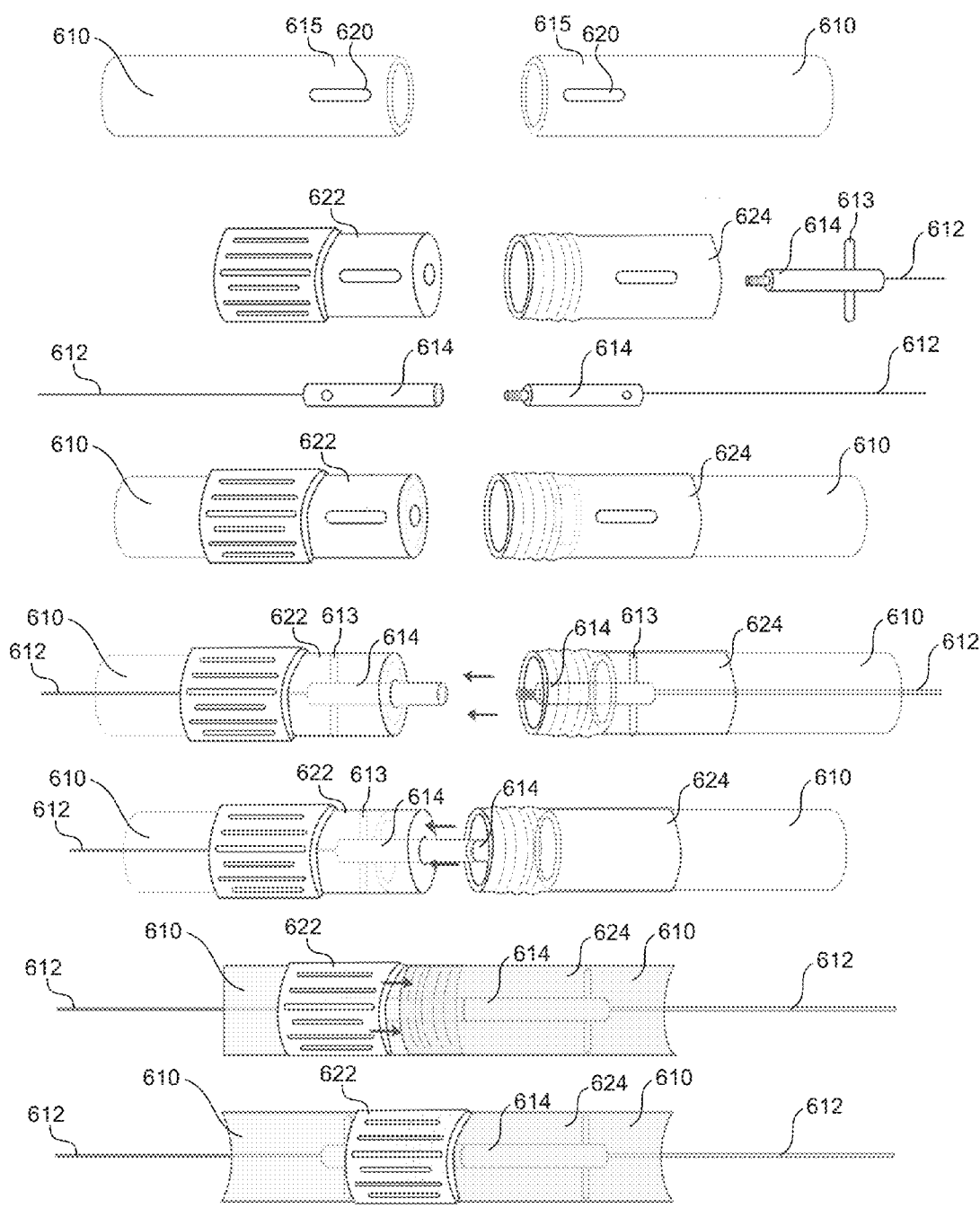
FIG. 6B depicts a partial schematic view of an example sequence of a connection for a multi-piece extendable pole according to the present disclosure.

Now referring to FIGS. 6A and 6B, an example is shown of a tool 100 having a multiple piece extendable pole 120, where one or more extension sections 610 can be installed into the tool between the handle mechanism 130 and the grasping mechanism 110. Each extension section 610 can attach internally and externally including with a pull wire 612 operably connected within the extension section(s) 610 and with pole attachment features around the pull wire 612 for external connection. The interfacing pole sections or adjacent pipe ends 615 can have holes 620 cut in the sides to an axial length suitable for installation and operation of the extendable pole 120. The pull wire 612 is operably connected to pull wire joint portions 614 which thread together at the interface of the pole extension sections 610. Upon connecting the pull wire 612, tension is applied to the system, urging the pole sections 610 toward one another. The pull wire joint portions 614 can have wings 613 extending radially outward for interfacing with holes formed within interfacing pole sections or adjacent pipe ends 615 to keep from spinning when the joints are connected. The holes 620 can be shaped to accommodate the travel of the pull wire 612, which when actuated, moves along the length of the pole section 610 within the holes 620 in the poles. The pole sections 610 have caps operably connected to the respective ends thereof. A male threaded section 624 of one of the interfacing pole sections of adjacent pipe ends 615 slides over the opposite side as the inner pull wire joints 614 are threaded together. A sliding female cap 622 is positioned over the opposing male threaded section 624 and threaded together to lock the poles 610 to one another. It is to be understood that one or more pole extension sections 610 can be installed in series to extend the tool for the operational needs of a user. These extension sections can also be used with other types of pole extension systems, e.g., telescoping sections including as described herein.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for manipulating objects from a distance comprising:
    a tool including:
        a grasping mechanism having a static wire guide configured to engage a wire to guide the grasping mechanism along the wire operable to manipulate a clip, both the grasping mechanism and the clip having corresponding interfacing features for the grasping mechanism to hold the clip firmly thereto in a gripping action, the grasping mechanism being cable actuated;
        an extendable pole operably connected to the grasping mechanism at an end thereof, the extendable pole having an extendable section for extending the pole and a connecting device therewithin for operable connection at an opposing end thereof; and a handle mechanism for manipulating the grasping mechanism; the handle mechanism operably connected to the extendable pole.

2. The system of claim 1, wherein the connecting device includes a cable extending from the grasping mechanism to the handle mechanism.

3. The system of claim 1, wherein the grasping mechanism is biased normally closed.

4. The system of claim 1, wherein the grasping mechanism has a geometry to facilitate handling of wire and lights.

5. The system of claim 1 wherein the clip has an attachment feature for attaching the clip to a feature of a structure.

6. The system of claim 1, wherein the extendable pole is configured to accommodate a removably insertable extension section for extending the pole.

7. The system of claim 1, wherein the grasping mechanism comprises opposing jaws for grasping an object, wherein one of the opposing jaws is static.

8. A tool comprising:
a grasping mechanism having a static wire guide configured to engage a wire to guide the grasping mechanism along the wire operable to manipulate a clip, both the grasping mechanism and the clip having corresponding interfacing features for the grasping mechanism to hold the clip firmly thereto in a gripping action;
an extendable pole operably connected to the grasping mechanism at a free end thereof; and
a handle mechanism for manipulating the grasping mechanism, the handle mechanism operably connected to the extendable pole.

9. The tool of claim 8, wherein the extendable pole includes one or more telescoping sections for extending the pole.

10. The tool of claim 8, wherein the extendable pole includes a connecting device therewithin for operable connection at an opposing end thereof.

11. The tool of claim 10, wherein the connecting device includes a cable to connect the internal components of the tool within the extendable pole.

12. The tool of claim 8, wherein the grasping mechanism is cable actuated.

13. The tool of claim 8, wherein the tool further includes a switch operably connected to the handle mechanism, the switch operable to lock a coil/spool of cable for varying a working length of cable when varying the length of the extendable pole.

14. The tool of claim 8, wherein the grasping mechanism is biased normally closed.

15. The tool of claim 8, wherein the grasping mechanism has a geometry to facilitate handling of wire and lights.

16. The tool of claim 8 wherein the clip has an attachment feature for attaching the clip to a feature of a structure.

17. The tool of claim 8, wherein the extendable pole is configured to accommodate a removably insertable extension section for extending the pole.

18. The tool of claim 8, wherein the grasping mechanism comprises opposing jaws for grasping an object, wherein one of the opposing jaws is static.

* * * * *